(12) United States Patent
Zhang et al.

(10) Patent No.: US 9,151,200 B2
(45) Date of Patent: Oct. 6, 2015

(54) SECONDARY AIR INTRODUCTION SYSTEM AND METHOD FOR SYSTEM OPERATION

(71) Applicant: Ford Global Technologies, LLC, Dearborn, MI (US)

(72) Inventors: Xiaogang Zhang, Novi, MI (US); Jianwen James Yi, Canton, MI (US); Wen Dai, Canton, MI (US); Paul M. Laing, Canton, MI (US); John Hedges, Canton, MI (US); Julia Helen Buckland, Commerce Township, MI (US); Harold Huimin Sun, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 13/867,734

(22) Filed: Apr. 22, 2013

(65) Prior Publication Data

US 2014/0060009 A1    Mar. 6, 2014

Related U.S. Application Data

(63) Continuation-in-part of application No. 13/605,895, filed on Sep. 6, 2012.

(51) Int. Cl.
*F01N 3/18* (2006.01)
*F01N 3/22* (2006.01)
*F01N 3/30* (2006.01)
*F02B 37/16* (2006.01)
(Continued)

(52) U.S. Cl.
CPC .. *F01N 3/18* (2013.01); *F01N 3/22* (2013.01); *F01N 3/30* (2013.01); *F01N 13/009* (2014.06); *F02B 37/168* (2013.01); *F02B 37/18* (2013.01); *Y02T 10/144* (2013.01); *Y02T 10/20* (2013.01)

(58) Field of Classification Search
CPC ........... F01N 3/18; F01N 13/009; F01N 3/22; F01N 3/30; F02B 37/168; F02B 37/18; Y02T 10/20; Y02T 10/144
USPC ................... 60/600, 602, 284, 289, 307, 308; 123/90.15
See application file for complete search history.

(56) References Cited

U.S. PATENT DOCUMENTS 4,406,126 A * 9/1983 Yokokura et al. ............. 60/605.1
5,136,842 A   8/1992 Achleitner et al.
5,271,906 A * 12/1993 Yuuki et al. ................... 422/177
(Continued)

FOREIGN PATENT DOCUMENTS

DE    4139291 A1 *  6/1993  ................ F01N 3/18
DE   10062377 A1     6/2002
(Continued)

*Primary Examiner* — Kenneth Bomberg
*Assistant Examiner* — Jason T Newton
(74) *Attorney, Agent, or Firm* — Julia Voutyras; Alleman Hall McCoy Russell & Tuttle LLP (57) ABSTRACT

A vehicle system operation method is provided. The method comprises, during a first operating condition, increasing back pressure in a first exhaust conduit positioned upstream of a turbine and downstream of a first emission control device and during a second operating condition, reducing back pressure in the first exhaust conduit and flowing boosted air from downstream of a compressor into a second exhaust conduit positioned upstream of a second emission control device and downstream of the turbine.

19 Claims, 6 Drawing Sheets

(51) Int. Cl.
 *F02B 37/18* (2006.01)
 *F01N 13/00* (2010.01)

(56) References Cited

U.S. PATENT DOCUMENTS

| | | | | |
|---|---|---|---|---|
| 5,458,855 | A * | 10/1995 | Gillbrand | 422/168 |
| 5,974,792 | A * | 11/1999 | Isobe | 60/278 |
| 5,996,347 | A * | 12/1999 | Nagae et al. | 60/602 |
| 6,092,371 | A | 7/2000 | Feucht et al. | |
| 6,227,180 | B1 * | 5/2001 | Hoffmann et al. | 123/564 |
| 6,263,672 | B1 | 7/2001 | Roby et al. | |
| 6,295,817 | B1 * | 10/2001 | Abthoff et al. | 60/612 |
| 6,311,494 | B2 | 11/2001 | McKinley et al. | |
| 6,722,125 | B1 * | 4/2004 | Pfalzgraf | 60/295 |
| 6,983,597 | B2 | 1/2006 | Wild et al. | |
| 7,162,861 | B2 * | 1/2007 | Khair | 60/280 |
| 7,231,760 | B2 | 6/2007 | Busch | |
| 7,260,929 | B2 | 8/2007 | Lehmann et al. | |
| 7,464,539 | B2 * | 12/2008 | Taylor et al. | 60/280 |
| 7,814,752 | B2 | 10/2010 | Hu | |
| 8,079,349 | B2 | 12/2011 | Rauner et al. | |
| 8,209,970 | B2 * | 7/2012 | Gonze et al. | 60/303 |
| 8,534,045 | B2 * | 9/2013 | Bird et al. | 60/277 |
| 8,661,786 | B2 * | 3/2014 | Hemsley | 60/280 |
| 8,820,056 | B2 * | 9/2014 | VanDyne et al. | 60/295 |
| 2005/0000217 | A1 | 1/2005 | Nau et al. | |
| 2006/0283187 | A1 * | 12/2006 | Broadbent | 60/600 |
| 2007/0062189 | A1 * | 3/2007 | Keppeler et al. | 60/605.1 |
| 2007/0271918 | A1 * | 11/2007 | Nishiyama et al. | 60/600 |
| 2008/0190107 | A1 * | 8/2008 | Ogiso | 60/602 |
| 2009/0133386 | A1 | 5/2009 | Porten et al. | |
| 2011/0107739 | A1 | 5/2011 | Shimizu et al. | |
| 2011/0214422 | A1 * | 9/2011 | VanDyne et al. | 60/607 |
| 2013/0118166 | A1 | 5/2013 | Bjorge et al. | |
| 2014/0144414 | A1 * | 5/2014 | Dean et al. | 123/568.14 |

FOREIGN PATENT DOCUMENTS

| | | | | |
|---|---|---|---|---|
| EP | 1452712 | A1 * | 9/2004 | F02D 41/02 |
| WO | WO 2007039811 | A1 * | 4/2007 | F02D 23/02 |

\* cited by examiner

SECONDARY AIR INTRODUCTION SYSTEM AND METHOD FOR SYSTEM OPERATION

CROSS REFERENCE TO RELATED APPLICATION

The present application is a continuation-in-part of U.S. patent application Ser. No. 13/605,895, filed Sep. 6, 2012, the content of which is incorporated herein by reference for all purposes.

FIELD

The present disclosure relates to a secondary air introduction system for an internal combustion engine.

BACKGROUND AND SUMMARY

Exhaust emission control devices, such as catalytic converters, achieve higher emission reduction after reaching a predetermined operating temperature. Thus, to lower vehicle emissions, various methods are possible to raise emission control device temperature as fast as possible.

In one approach to raise the emission control device temperature, an engine is operated with a rich air-fuel ratio and secondary air is directly introduced into the exhaust upstream of an emission control device. Such a system is disclosed in U.S. Pat. No. 5,136,842. In this system, the excess fuel from the engine is expelled into the exhaust, where it reacts with the secondary air upstream of the emission control device. The reacted fuel increases the temperature of the exhaust, thus heating the emission control device. However, in order to introduce the secondary air into the exhaust, a secondary air pump is used to increase the pressure of the secondary air above the exhaust pressure. Use of such a pump may degrade fuel efficiency and requires additional packaging space, thus reducing the efficiency of the engine.

The inventors herein have recognized the issues with the above approach and offer a method to at least partly address them. In one embodiment, a method for operation of a vehicle system is provided. The method includes, during a first operating condition, increasing back pressure in a first exhaust conduit positioned upstream of a turbine and downstream of a first emission control device and during a second operating condition, reducing back pressure in the first exhaust conduit and flowing boosted air from downstream of a compressor into a second exhaust conduit positioned upstream of a second emission control device and downstream of the turbine.

In this way, back pressure is generated in the exhaust system which causes an increase in the temperature of the first emission control device, increasing exhaust gas energy retention in the exhaust system and reducing emissions. Further emission reductions are achieved by flowing the boosted air, which is oxygen-rich, to the second emission control device, after the back pressure is reduced. The excess oxygen in the secondary air will react with reductants, such as unburnt fuel, in the exhaust to create an exothermic reaction that will heat the second emission control device, thereby reducing emissions. In this way, boosted air downstream of the compressor may be directed to the exhaust upstream of an emission control device without utilizing a separate pump. By utilizing the pressure differential between the throttle inlet pressure downstream of the compressor and the turbine outlet pressure near where the secondary air is introduced into the exhaust conduit, the boosted air may be driven to the exhaust without a separate pressurization mechanism. The aforementioned emission reduction techniques may be implemented during different operating conditions to effectively reduce emissions.

The present disclosure may offer several advantages. For example, by relying on boosted air rather than air pressurized by a pump, a separate air pump may be dispensed with, thus improving engine efficiency. Additionally, by increasing back pressure upstream of the turbine the first emission control device may be rapidly heated, during a cold start for example, to further reduce emissions prior to the flowing of the boosted air to the emission control device.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

To rapidly heat an emission control device such as a catalytic converter, vehicles may include a secondary air introduction system, also referred to as a ported electric thermactor air (PETA) system, to introduce oxygen-rich secondary air into the exhaust upstream of the emission control device and downstream of a turbine. The excess oxygen in the secondary air will react with reductants, such as unburnt fuel, in the exhaust to create an exothermic reaction that will heat the emission control device. To efficiently introduce the secondary air to the exhaust, boosted air downstream of a compressor may be routed to the exhaust, either via a wastegate duct coupled across a turbine or via an exhaust passage. In some examples, control of the reaction may be provided by regulating a wastegate valve in the wastegate duct or via a flow valve in a secondary air conduit. Furthermore, to heat another emission control device (e.g., close couple converter) upstream of a turbine, during another operating condition, a turbine inlet valve and/or a turbine bypass valve may be operated to increase the back pressure upstream the turbine, to provide exhaust gas energy retention. The exhaust gas energy retention may improve surface chemical reaction in the emission control device and reduce engine throttling. As a result, emissions may be further reduced. The aforementioned emission reduction techniques may be implemented during different operating conditions to effectively reduce emissions.

Figure 1:
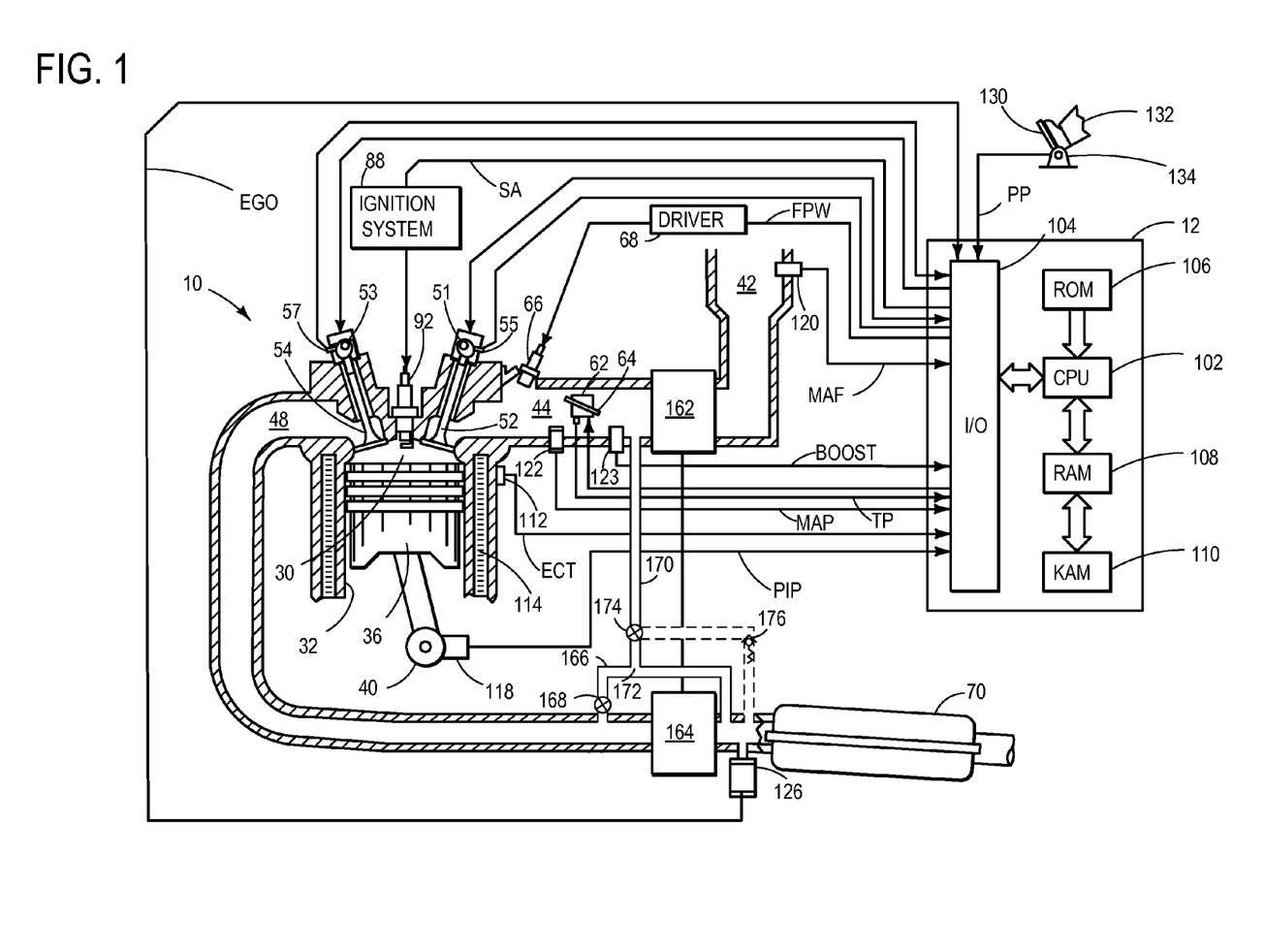
FIG. 1 shows a schematic diagram of an engine.
Figure 2:
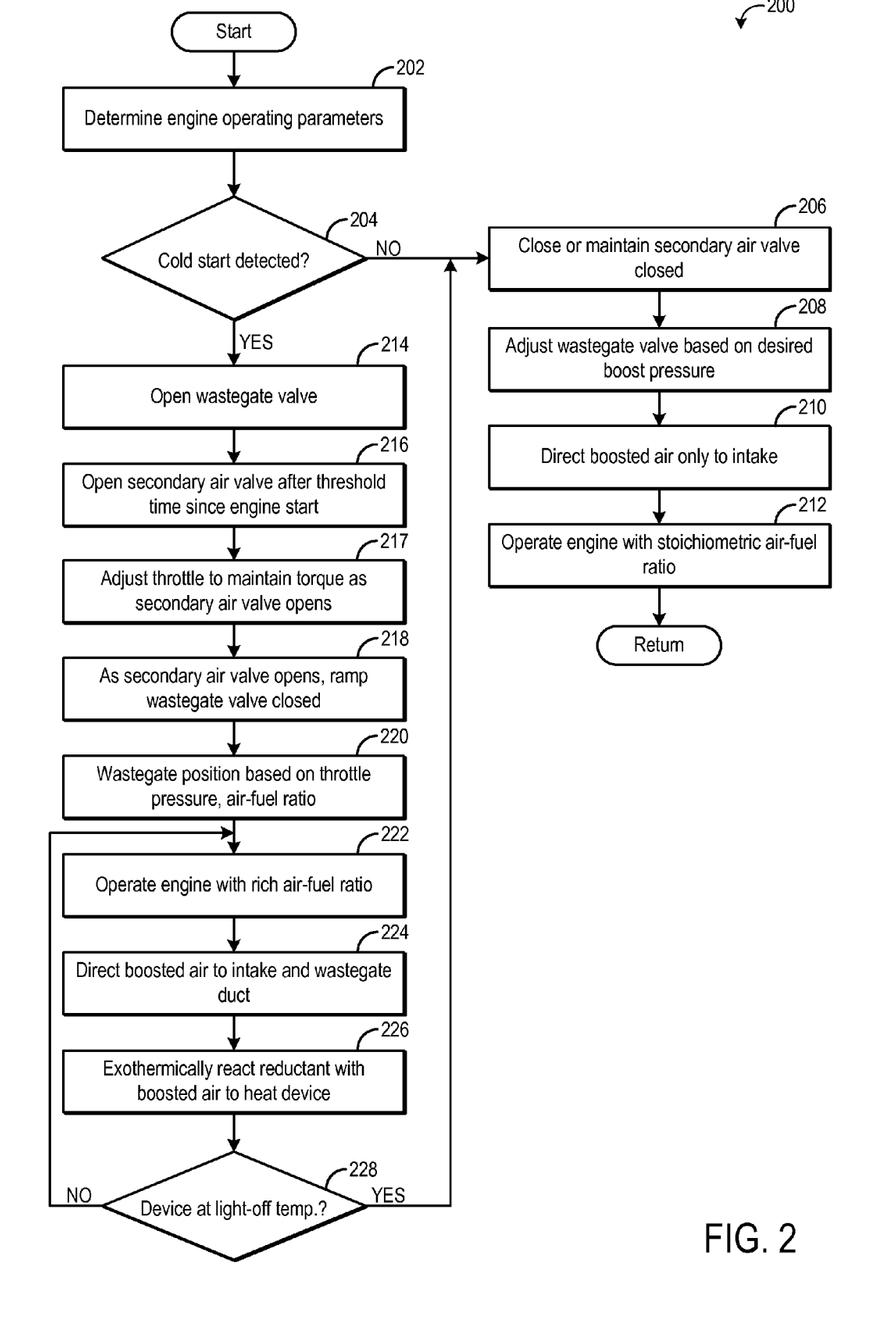
FIG. 2 shows a flow chart illustrating a method for heating an emission control device via introduction of boosted air.
Figure 3:
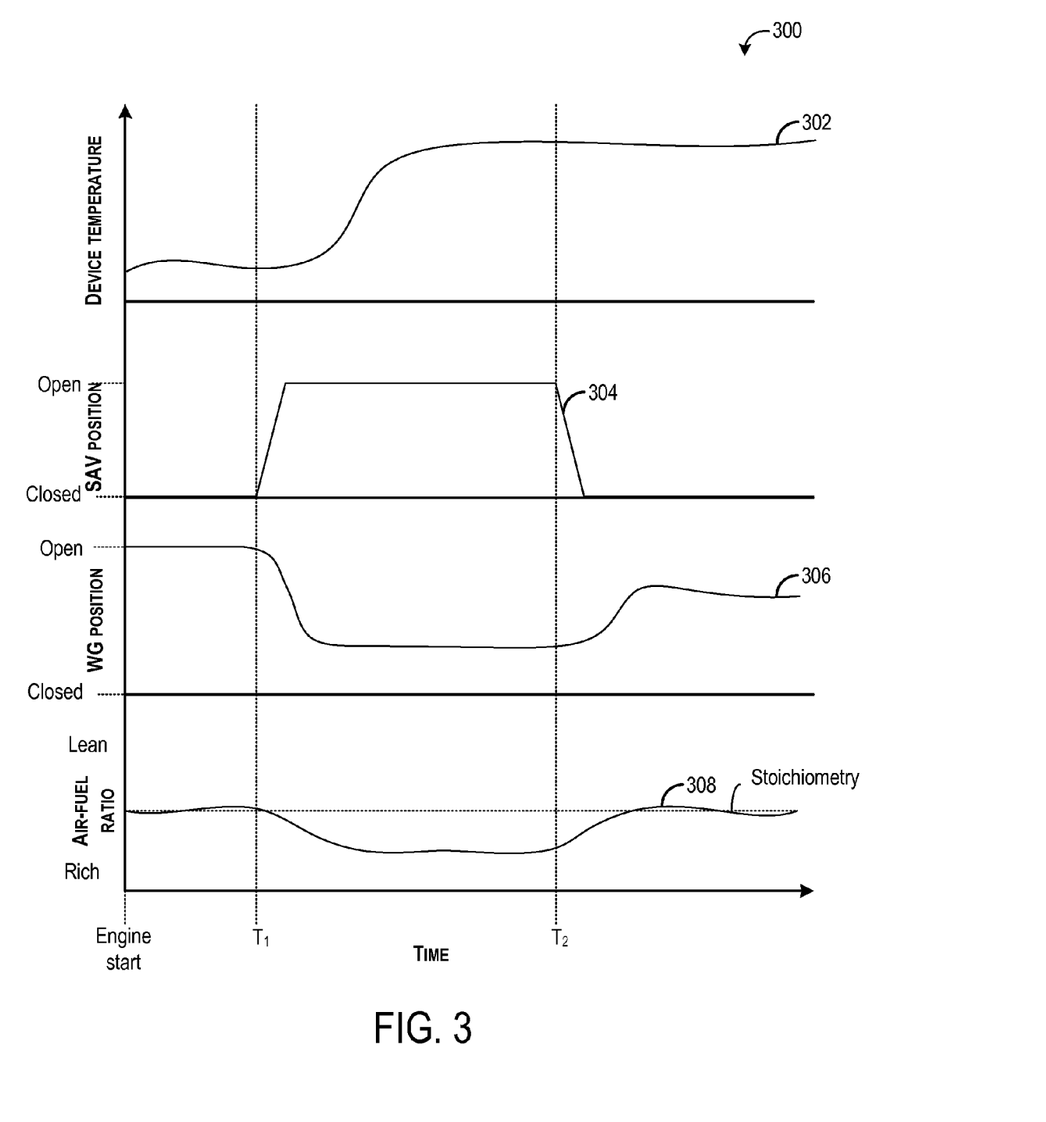
FIG. 3 is a diagram illustrating various engine operating parameters during the execution of the method of FIG. 2.
Figure 4:
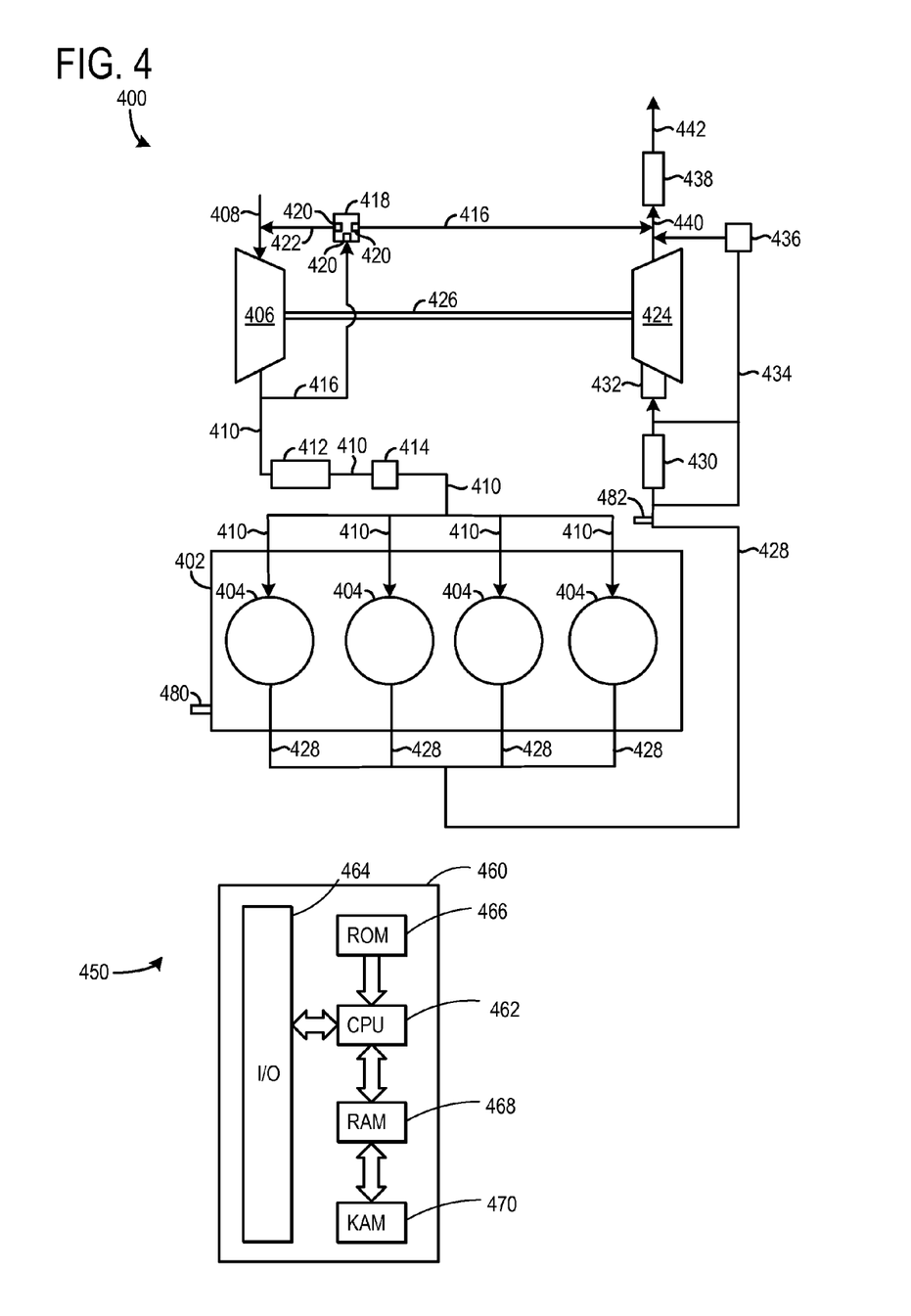
FIG. 4 shows a schematic diagram of an example vehicle system and engine.
Figure 5:
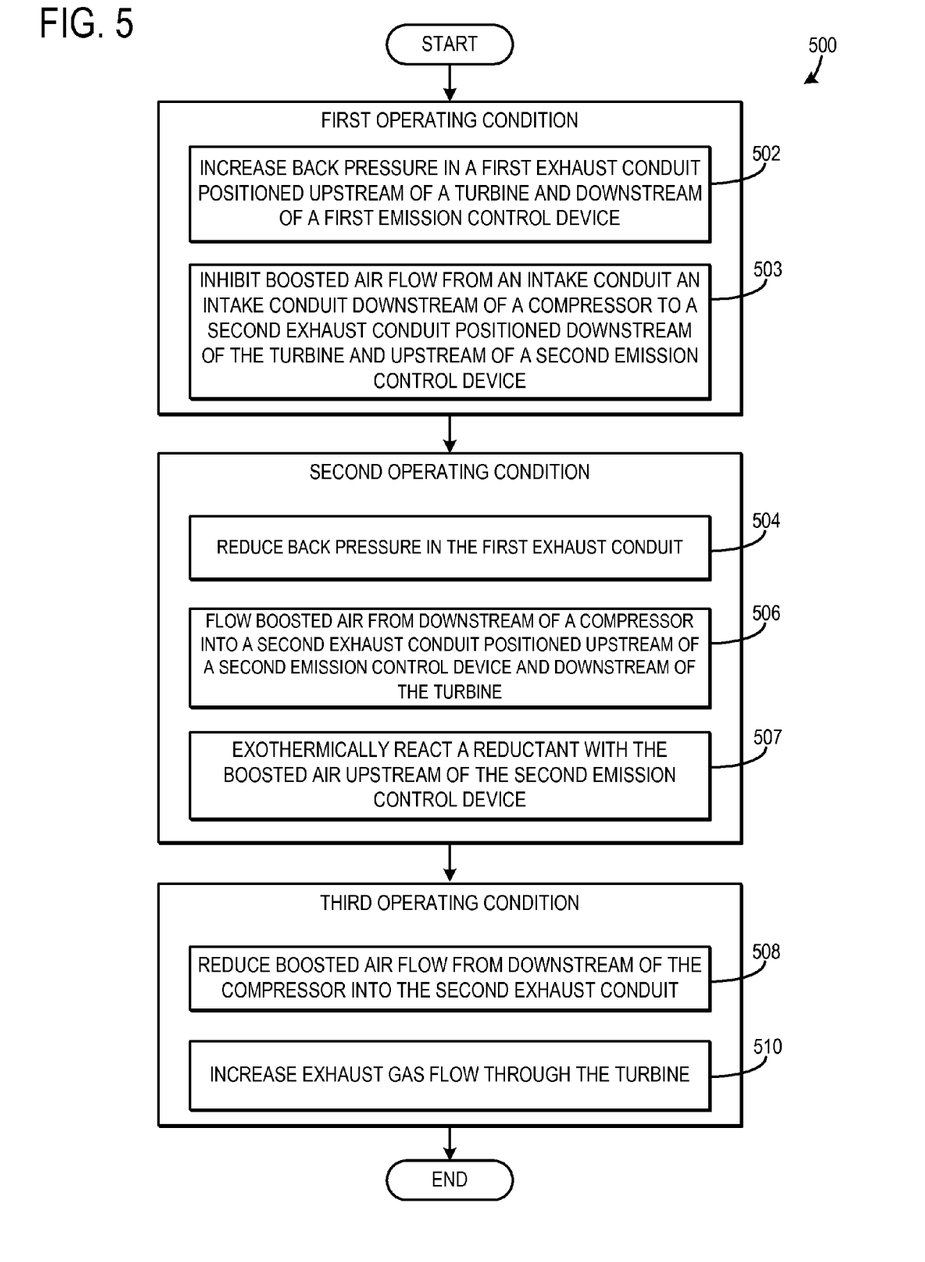
FIGS. 5 and 6 show methods for operation of a vehicle system.
Figure 6:
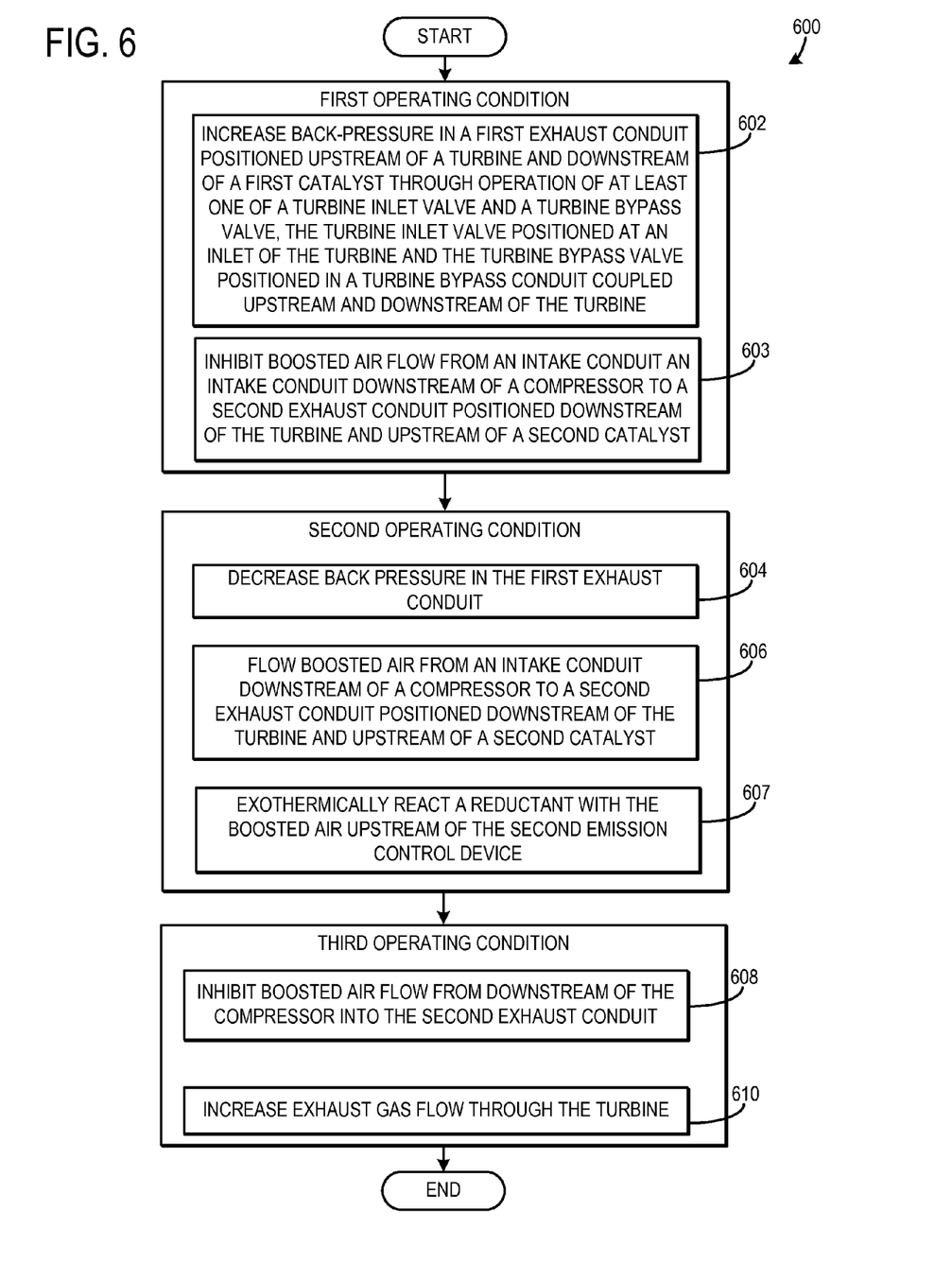

FIG. 1 is an example engine including a secondary air introduction system and a controller configured to carry out the method of FIG. 2. Example engine operating parameters during an engine cold start, in which an emission control device is heated via secondary air, are illustrated in FIG. 3. FIG. 4 shows another example engine and secondary air induction system. FIGS. 5 and 6 show methods for operation of the vehicle system.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to an exhaust passage upstream (e.g., directly upstream) of emission control device 70. Additionally or alternatively, an exhaust gas sensor may be coupled downstream of turbine 164, discussed in greater detail herein. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along intake passage 42. For a turbocharger, compressor 162 may be at least partially driven by a turbine 164 (e.g., via a shaft) arranged along exhaust passage 48. Air flow through turbine 164 may be regulated by a wastegate valve 168 positioned in a wastegate duct 166 coupled across the turbine. When the wastegate valve 168 is open, exhaust may bypass turbine 164 and instead travel through wastegate duct 166 before being admitted to the exhaust passage 48 downstream of the turbine 164. In this way, the turbine speed, and hence boost pressure, may be regulated. The position of wastegate valve 168 may be controlled by a signal sent from controller 12. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 12. Further, a sensor 123 may be disposed in intake manifold 44 for providing a BOOST signal to controller 12.

Engine 10 may include a secondary air introduction system to introduce secondary air to the exhaust system. A secondary air conduit 170 may couple intake passage 42 downstream of compressor 162 to the exhaust system. In a first embodiment, secondary air conduit 170 may be coupled at its downstream end to wastegate duct 166 downstream of wastegate valve 168. In this way, boosted air from downstream of compressor 162 may be directed to wastegate duct 166 via secondary air conduit 170. The outlet of secondary air conduit 170 may be coupled to an inlet of wastegate duct 166 at port 172. A secondary air valve 174, regulated by controller 12, in secondary air conduit 170 may regulate the amount of boosted air directed to wastegate duct 166. The amount of exhaust introduced into wastegate duct 166 may be controlled by secondary air valve 174. In doing so, unburnt hydrocarbons or other reductants in the exhaust may exothermically react with the oxygen in the introduced secondary air, releasing heat to raise the temperature of a downstream emission control device (e.g., emission control device 70). Additionally, by directing the boosted air to the wastegate duct, packaging space in the engine may be conserved. For example, by positioning the inlet of the secondary air conduit proximal to the downstream side of the compressor, the shortest path to the exhaust system results in the secondary air conduit outlet being proximal to the wastegate duct. Further, by controlling both the amount of boosted air and the amount exhaust directed to wastegate duct 166, via secondary air valve 174 and wastegate valve 168, respectively, the exothermic reaction may be regulated to maintain a desired temperature and/or rate of reaction. In some examples, the exothermic reaction may also be regulated by air fuel control adjustment based on a signal from an exhaust gas valve (e.g., a UEGO valve).

In a second embodiment, depicted in FIG. 1 by the dashed lines, secondary air conduit 170 may be coupled at its downstream end to exhaust passage 48 downstream of turbine 164. In this embodiment, the amount of secondary air or boosted air introduced into the exhaust may also be controlled via secondary air valve 174. Because the pressure of the exhaust at the turbine outlet is typically lower than the pressure of the intake air downstream of the compressor, the secondary air may be driven to the exhaust passage without an additional pressurization mechanism, whether the secondary air is delivered directly to the exhaust passage downstream of the turbine, or whether it is directed to the wastegate duct. However, under some conditions, such as immediately following an engine start, the exhaust pressure at the turbine outlet may be higher than the pressure downstream of the compressor. To prevent exhaust from traveling into the intake passage during these conditions, a check valve 176 may be present in the secondary air conduit 170.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Turning to FIG. 2, a method 200 for heating an emission control device is presented. Method 200 may be carried out by controller 12 according to instructions stored thereon in order to heat emission control device 70 via an exothermic reaction started in wastegate duct 166. Method 200 comprises, at 202, determining engine operating parameters. The determined engine operating parameters may include engine speed, engine load, engine temperature, exhaust temperature, time since engine start, etc. At 204, it is determined, based on the engine operating parameters, if an engine cold start is detected. The engine cold start may be an engine start and period of operation following an engine start wherein the engine is relatively cool, such as at ambient temperature at engine start. During an engine cold start, the emission control device may be below operating temperature, such as below its light-off temperature, and thus emissions in the exhaust, such as unburnt hydrocarbons, NOx, and CO, may slip past the device to the atmosphere. The device may continue to operate below optimal efficiency until the engine reaches operating temperature, which depending on the ambient temperature, may take anywhere from a few seconds to a minute or longer. To rapidly heat the emission control device during an engine cold start, an exothermic reaction may be initiated by introducing oxygen-rich intake air to the exhaust upstream of the emission control device, where unburnt hydrocarbons and other reductants react with the oxygen to produce heat.

Thus, if it is determined at 204 that the engine is not operating under cold start conditions, method 200 proceeds to 206 to keep the secondary air valve closed, as heating of the emission control device is not indicated. At 208, the wastegate valve is adjusted to provide desired boost pressure, and at 210, the boosted intake air is directly only to the intake of the engine. At 212, the engine is operated with stoichiometric air-fuel ratio, or other desired air-fuel ratio based on engine operating parameters and detected exhaust oxygen content, and then method 200 ends.

However, if it is determined that the engine is operating under cold start conditions, method 200 proceeds to heat the emission control device by introducing boosted air to the exhaust. To introduce the boosted air and maintain a controlled exothermic reaction that does not result in high temperatures that may degrade exhaust system components, the secondary air valve may be adjusted independent of desired boost pressure. This is in contrast to the non-cold start conditions described above, where the wastegate valve is adjusted based on desired boost pressure. Thus, at 214, the wastegate valve is opened or maintained in the open position immediately following the engine start. Opening the wastegate valve may divert exhaust around the turbine, thus preventing additional exhaust cooling that may result from traversing the turbine. However, an open wastegate may also cause a reduction in the amount of boost pressure, delaying the introduction of the boosted air to the exhaust. Thus, under some conditions, the wastegate valve may be opened following a cold start, while in other conditions, the wastegate may be closed following a cold start.

The secondary air valve may have a default position of the fully closed position, in order to avoid diverting intake air away from the intake manifold under conditions where heating of the emission control device is not indicated. Thus, immediately following an engine start, the secondary air valve is in the closed position. As the temperature of the exhaust immediately following the engine start may be too cold to initiate an exothermic reaction, the secondary air valve may be kept closed for a duration immediately following the cold start. Further, immediately following the engine start, sufficient boost pressure may not be available to drive the secondary boosted air the wastegate duct. However, as indicated at 216, the secondary air valve may be opened after a threshold amount of time since the engine start. The threshold amount of time may be a predefined time after which sufficient exhaust temperature and boost pressure have built. In other embodiments, the threshold amount of time may be based on operating conditions, such as the pressure differential between the throttle inlet pressure and the turbine outlet pressure. In this case, the threshold amount of time may be the time when throttle inlet pressure exceeds turbine outlet pressure.

At 217, the intake throttle is adjusted to maintain torque as the secondary air valve opens. When the secondary air valve is open, a portion of the boosted intake air is diverted to the wastegate duct. As a result, less boosted air than desired is provided to the engine for the requested torque. It will be appreciated that the boosted air may have a higher temperature than the ambient air. To maintain torque, the throttle may be opened. At 218, the wastegate valve is ramped closed as the secondary air valve is opened. However, if the wastegate was initially closed, at 218 the wastegate valve may be ramped open as the secondary valve is opened. However in other examples, the wastegate valve may be ramped closed and the secondary valve may be ramped open at 218. The wastegate valve may set to a position that provides a desired amount of exhaust to the wastegate duct. Thus, as indicated at 220, the wastegate valve position may be based on various parameters of the desired exothermic reaction. For example, the position of the wastegate valve, and hence the amount of exhaust admitted to the wastegate duct, may be based on throttle inlet pressure and the position of the secondary air valve (e.g., how much secondary air is reaching the wastegate duct), the exhaust air-fuel ratio (e.g., how much reductant is available in the exhaust to be reacted), difference between current and desired emission control device temperature, etc.

At 222, the engine may be operated with rich air-fuel ratio. To provide extra reductants in the exhaust to react in the wastegate duct, extra fuel may be injected to the cylinders. At 224, the boosted air downstream of the compressor is directed to both the intake of the engine and as secondary air to the wastegate duct. The boosted air may be directed to the wastegate duct via the secondary air conduit. At 226, the reductant in the exhaust is exothermically reacted with the secondary air to heat the emission control device.

At 228, it is determined if the emission control device is at light-off or other predefined operating temperature. The temperature of the emission control device may be determined based on operating conditions, such as exhaust temperature and mass flow rate, or it may be determined based on feedback from a temperature sensor in the device. If the device has not yet reached operating temperature, method 200 loops back to 222 to operate the engine with a rich air-fuel ratio. If the device has reached operating temperature, method 200 proceeds to 206 to close the secondary air valve, and as explained earlier, adjust the wastegate valve based on desired boost pressure, and operate the engine with stoichiometric air-fuel ratio or other desired air-fuel ratio, and method 200 then returns.

While method 200 presented above delivers secondary air to a wastegate duct during engine cold-start conditions, other variations are possible. For example, as explained above with respect to FIG. 1, the secondary air conduit may deliver boosted air to the exhaust passage downstream of the turbine instead of the wastegate duct. In this configuration, control of the wastegate valve (if one is present) may continue to be based on desired boost pressure rather than to control the exothermic reaction. The secondary air valve opening is still delayed until after throttle inlet pressure exceeds turbine outlet pressure. In another example, secondary air may be delivered to the wastegate duct (or exhaust passage) during a regeneration event of a downstream emission control device. Emission control devices, such as particulate filters, may be regenerated when the load of exhaust emissions (e.g., soot) in the device reaches capacity. The regeneration may include raising the temperature of the device to burn off the built up matter. Upon initiation of the regeneration event, the secondary air valve may be opened, and the wastegate valve may be controlled to provide a desired amount of exhaust to the wastegate duct to start a reaction between the exhaust and the secondary air to heat the emission control device. Further, during the regeneration, the engine air-fuel ratio may be commanded rich.

FIG. 3 is a diagram 300 showing example operating parameters during an engine cold start. The operating parameters depicted in diagram 300 include emission control device temperature (illustrated by curve 302), secondary air valve (SAV) position (illustrated by curve 304), wastegate valve (WG) position (illustrated by curve 306), and air-fuel ratio (illustrated by curve 308). For each operating parameter depicted, time is illustrated on the horizontal axis, and the values of each respective operating parameter are depicted on the vertical axis. The time duration depicted in diagram 300 begins at the engine start and ends at a time after the engine and emission control device have reached operating temperature.

The emission control device illustrated by curve 302 starts with a relatively low temperature, as the engine and exhaust components are at ambient temperature upon start-up of the engine. Following time $T_1$, the device temperature starts to increase, due in part to the heating of the exhaust gas as the engine warms up and in part to the exothermic reaction occurring the wastegate duct, as explained below. After time $T_2$, the device has reached its operating temperature.

The position of the secondary air valve, depicted by curve 304, is in its default, closed position prior to time $T_1$. However, at time $T_1$, the secondary air valve opens, and remains open until the device reaches operating temperature at time $T_2$. The secondary air valve may open after a threshold amount of time passes since the engine start, such as three seconds, or it may open once throttle inlet pressure exceeds turbine outlet pressure or once the exhaust temperature reaches a threshold temperature.

The wastegate valve position, depicted by curve 306, may be in the fully open position immediately following the engine start, to reduce extra exhaust cooling resulting from passage of the exhaust through the turbine. At time $T_1$, when the secondary air valve opens, the wastegate valve ramps closed. However, the wastegate valve remains partially open between time $T_1$ and $T_2$, to admit some exhaust gas to the wastegate duct to react with the secondary air. After time $T_2$, the wastegate valve is controlled to provide desired boost pressure of the intake air in the intake system.

To produce extra reductants in the exhaust, the engine air-fuel ratio, depicted by curve 308, may be commanded rich after time $T_1$. Prior to time $T_1$ and after time $T_2$, air-fuel ratio may be maintained near stoichiometry. However, before time $T_1$ and after $T_2$, air-fuel ratio may be commanded to a suitable ratio for the given operating conditions.

Thus, the system and method presented herein provide for heating an emission control device by introducing boosted intake air to the exhaust system upstream of the emission control device. The boosted air reacts with one or more reductants in the exhaust (such as unburnt hydrocarbons) to produce heat. The boosted air may be introduced to the exhaust system during an engine cold start, where the engine is operating at ambient temperature at start-up. The boosted air may be introduced when a temperature of the emission control device is below a threshold, such as light-off temperature or a threshold regeneration temperature. The boosted air may be directed to a wastegate duct of a turbine, thus allowing for the reaction between the exhaust and the boosted air to be controlled by coordinate adjustment of a wastegate valve and secondary air valve. In other examples, the boosted air may be directed to the exhaust passage downstream of the turbine. By introducing boosted air at the wastegate duct or exhaust passage downstream of the turbine, the pressure difference between the inlet of the secondary air conduit (e.g., downstream of the compressor) and the outlet of the secondary air conduit (e.g., downstream of the turbine) may drive the introduction of the air rather than a separate air pump. In this way, engine packaging space may be reduced and fuel economy may be improved.

FIG. 4 shows another example of a vehicle system 400 (e.g., secondary air induction system) including an engine 402. The engine 402 may include similar components to the engine 10 shown in FIG. 1. The engine 402 includes a plurality of cylinders 404. Specifically, four cylinders in an inline configuration are depicted. However, an engine having an alternate number of cylinders and/or an engine having an alternate cylinder configuration have been contemplated.

The engine includes a compressor 406 configured to provide boosted air to the cylinders 404, under some operating conditions. Thus, compressed air may be flowed to the cylinders 404 in the engine 402.

An intake conduit 408, denoted via an arrow, provides intake air to the compressor 406. Additionally, intake conduits 410, denoted via arrows, provide intake air to the cylinders 404. A heat exchanger 412 is coupled to one of the intake conduits 410. A throttle 414 is also coupled to one of the intake conduits 410. The throttle 414 is configured to adjust the flowrate of the intake air to the cylinders 404.

A secondary air conduit 416 provides fluidic communication between one of the intake conduits 410, downstream of the compressor 406 and upstream of the cylinders 404 and throttle 414. A flow valve 418 is coupled to the secondary air conduit 416. In the depicted example the flow valve is a 3-way valve including 3 ports 420. The flow valve 418 may be configured to independently control air or gas flow through the 3 ports 420. A compressor bypass conduit 422 is also included in the vehicle system 400. The compressor bypass conduit 422 is coupled to one of the ports 420 and the intake conduit 408. In this way, intake air may be flowed around the compressor 406. Thus, the flow valve 420 may operate as a recirculation valve to manage compressor surge. Additionally, the flow valve 418 may be configured to selectively permit (e.g., enable and inhibit) boosted airflow from an intake conduit downstream of the compressor 406 and upstream of the throttle 414 to an exhaust conduit downstream of a turbine 424 and upstream of a second emission control device 438. In this way, air may be flowed to a location upstream of the second emission control device to deliver oxygen-rich air to the second emission control device, during desired operating conditions.

The vehicle system 400 further includes a turbine 424 coupled to the compressor via a drive shaft 426. The turbine 424, compressor 406, and drive shaft 426 may be included in a turbocharger. The turbine 424 is in fluidic communication with the cylinders 404. Exhaust conduits 428, denoted by arrows, providing this fluidic communication. A first emission control device 430 is positioned upstream of the turbine 424 and downstream of the cylinders 404.

A turbine inlet valve 432 is positioned in an inlet of the turbine 424. The turbine inlet valve 432 is configured to adjust the amount of exhaust gas flowing through the turbine 424.

A turbine bypass conduit 434 is also included in the vehicle system 400. The turbine bypass conduit 434 is coupled upstream and downstream of the first emission control device 430 to one of the exhaust conduits 428. A turbine bypass valve 436 is also included in the vehicle system 400. The turbine bypass valve 436 is configured to adjust the flow of exhaust gas through the turbine bypass conduit 434. The turbine bypass valve 436 and the turbine inlet valve 432 may be operated (e.g., at least partially closed) to increase back pressure in the exhaust conduit directly upstream of the turbine 424. Thus, the turbine bypass valve and/or the turbine inlet valve are configured to obstruct gas-flow therethrough during certain operating conditions to increase back pressure in the exhaust conduit upstream of the turbine. Increasing the back pressure in this way may cause an increase in the temperature of the first emission control device, thereby reducing emissions, during certain operating conditions. Additionally, back pressure may be generated through operation of the turbine bypass valve and the turbine inlet valve to provide engine braking, when desired. The turbine bypass conduit 434 and the turbine bypass valve 436 may be provided to enable exhaust gas to bypass the turbine when a decrease in turbocharger speed is desired. Moreover, gasses may be flowed past the turbine through the bypass conduit to enable the emission control device downstream of the turbine to reach desirable operating temperatures more quickly. Furthermore, inlets to the turbine bypass conduit may be positioned upstream and downstream of the emission control device 430 to enable exhaust gas to bypass the emission control device 430 when desired through operation of the turbine bypass valve 436 and turbine inlet valve 432.

A second emission control device 438 is positioned downstream of the turbine 424. An exhaust passage 440, denoted via an arrow, is positioned between the turbine 424 and the second emission control device 438. As shown, the secondary air conduit 416 and turbine bypass conduit 434 open into the exhaust passage 440. In this way, oxygen-rich boosted air may be flowed to the second emission control device 438 via the secondary air conduit through operation of the flow valve, when desired. One or both of the first and second emission control devices may be catalysts. An exhaust conduit 442, denoted via an arrow, is coupled to the second emission control device 438 and configured to flow exhaust gas to the surrounding environment. The exhaust conduit 442 may include a tail-pipe in one example.

A control sub-system 450 may be included in the vehicle system 400. The control sub-system 450 includes a controller 460. The controller 460 may be similar to the controller 12 shown in FIG. 1. Therefore, the controller 460 may include similar component to the controller 12 shown in FIG. 1 such as a microprocessor unit 462, input/output ports 464, an electronic storage medium for executable programs and calibration values shown as read only memory chip 466 in this particular example, random access memory 468, keep alive memory 470, and a data bus.

The controller 460 is in electronic communication (e.g., wired and/or wireless) with the flow valve 418, the turbine inlet valve 432, the turbine bypass valve 436, and the throttle 414. It will be appreciated that the aforementioned valves are considered actuators in the control sub-system 450. Therefore, the controller 460 may be configured to adjust the aforementioned actuators into desired configurations.

The control sub-system 450 may further include a plurality of sensors such as an engine temperature sensor 480 and an exhaust temperature sensor 482 coupled to one of the exhaust conduits 428. Additionally, one or more exhaust gas oxygen sensors may be coupled to locations in the exhaust system upstream and downstream of the turbine.

The control sub-system 450 may be configured to increase the back pressure in an exhaust conduit upstream of the turbine 424 and downstream of the emission control device 430 via operation of the turbine inlet valve 432 and/or the turbine bypass valve 436 during a first operating condition. Thus, the turbine inlet valve may partially obstruct gas flow into the turbine and the turbine bypass valve may partially obstruct (e.g., substantially inhibit) gas flow through the turbine bypass conduit.

The control sub-system 450 may further be configured to flow boosted air from an intake passage downstream of the compressor 406 to an exhaust passage downstream of the turbine 424 and upstream of the emission control device 438 through secondary air conduit 416. Additionally, in one example the control sub-system may reduce back pressure in the exhaust conduit upstream of the turbine 424 and downstream of the emission control device 430 through operation of the turbine inlet valve 432 and/or turbine bypass valve 436 during the second operating condition. Specifically, in one example the back pressure may be reduced in the exhaust conduit through opening of the turbine bypass valve by a greater amount and sustaining the configuration of the turbine inlet valve (e.g., substantially inhibit or partially obstruct exhaust flow into the turbine).

The control sub-system 450 may further be configured to reduce (e.g., substantially inhibit) flowing boosted air from the intake passage downstream of the compressor 406 to the exhaust passage downstream of the turbine 424 and upstream of the emission control device 438 through the secondary air conduit 416. Additionally, the control sub-system 450 may be configured to increase the opening (e.g., fully open) of the turbine inlet valve 432 and increase closing (e.g., substantially close) of the turbine bypass valve 436, during the third operating condition.

The control sub-system 450 may also be configured to increase closing of the turbine inlet valve 432 and/or the turbine bypass valve 436, during a fourth operating condition. In this way, engine braking may be provided to the engine. Thus, the fourth operating condition may be when engine braking is requested in the vehicle.

In some examples, the operating conditions may be sequentially periods of time after a cold start. A cold start may be defined as an engine start implemented when the engine temperature is below a threshold value. For instance, the first operating condition may be 3-5 seconds after a cold start, the second operating condition may be 5-20 seconds after a cold start, and the third operation condition may be greater than 20 seconds after a cold start. However in other examples, the operating conditions may include engine temperature ranges or exhaust gas temperature ranges. Therefore, the first operating condition may be when the engine is below a threshold temperature and the second operating condition may be when the engine is above a threshold temperature. Further still in some examples, the operating conditions may include exhaust gas compositions and/or engine speeds. The aforementioned control sub-system functionality may include instructions stored on a computer readable medium executable via a processor.

FIG. 5 shows a method 500 for operation of a vehicle system. Method 500 may be implemented by the vehicle systems discussed above with regard to FIGS. 1-4 or may be implemented via other suitable vehicle systems.

At 502 the method includes increasing back pressure in a first exhaust conduit positioned upstream of a turbine and downstream of a first emission control device. Increasing the back pressure may include at least partially closing the turbine inlet valve and/or the turbine bypass valve. At 503 the method includes inhibiting boosted air flow from an intake conduit positioned downstream of a compressor to a second exhaust conduit positioned downstream of the turbine and upstream of a second emission control device.

Next at 504 the method includes reducing back pressure in the first exhaust conduit. Reducing the back pressure in the first exhaust conduit may be achieved through opening of the turbine bypass valve and sustaining the partial closing of the turbine inlet valve. Therefore, during the reduction in back pressure the turbine inlet valve may still be configured to partially obstruct exhaust gas flow through the turbine.

At 506 the method includes flowing boosted air from downstream of a compressor into a second exhaust conduit positioned upstream of a second emission control device and downstream of the turbine. At 507 the method includes exothermically reacting a reductant with the boosted air upstream of the second emission control device.

At 508 the method includes reducing boosted air flow from downstream of the compressor into the second exhaust conduit. Reducing the boosted air flow may include substantially inhibiting air flow through the secondary air conduit via operation of the flow valve.

At 510 the method includes increasing exhaust gas flow through the turbine. Increasing exhaust gas flow through the turbine may include closing the turbine bypass valve and opening (e.g., fully opening) the turbine inlet valve.

Steps 502 and 503 are implemented during a first operating condition, steps 504, 506, and 507 are implemented during a second operating condition, and steps 508 and 510 are implemented during a third operating condition. It will be appreciated that exhaust back pressure upstream of the turbine may increase during the third operating condition when compared to the other two operating conditions.

In one example, the first operating condition may be when the engine is below a threshold temperature and the second operating condition may be when the engine is above the threshold temperature. In another example, the first operating condition is when engine braking is requested in the vehicle.

FIG. 6 shows a method 600 for operation of a vehicle system. Method 600 may be implemented by the vehicle systems discussed above with regard to FIGS. 1-4 or may be implemented via other suitable vehicle systems.

At 602 the method includes increasing back pressure in a first exhaust conduit positioned upstream of a turbine and downstream of a first catalyst through operation of at least one of a turbine inlet valve and a turbine bypass valve, the turbine inlet valve positioned at an inlet of the turbine and the turbine bypass valve positioned in a turbine bypass conduit coupled upstream and downstream of the turbine. At 603 the method includes inhibiting boosted air flow from an intake conduit an intake conduit downstream of a compressor to a second exhaust conduit positioned downstream of the turbine and upstream of a second catalyst.

At 604 the method includes decreasing back pressure in the first exhaust conduit and at 606 the method includes flowing boosted air from the intake conduit downstream of the compressor to the second exhaust conduit positioned downstream of the turbine and upstream of the second catalyst. At 607 the method includes exothermically reacting a reductant with the boosted air upstream of the second emission control device.

At 608 the method includes inhibiting boosted air flow from downstream of the compressor into the second exhaust conduit.

At 610 the method includes increasing exhaust gas flow through the turbine. Increasing exhaust gas flow through the turbine may include closing the turbine bypass valve and opening (e.g., fully opening) the turbine inlet valve.

Steps 602 and 603 are implemented during a first operating condition. Steps 604, 606, and 607 are implemented during a second operating condition. Steps 608 and 610 are implemented during a third operating condition.

In one example, the first operating condition is when the first catalyst is below a threshold temperature and the second operating condition is when the first catalyst is above a threshold temperature. In another example, the first operating condition includes when the engine is off and engine braking is requested. Further in some examples, the first operating condition is when the first catalyst is below a threshold temperature and the second operating condition is when the first catalyst is above a threshold temperature and the second catalyst is below a threshold temperature. The third operating condition may be when the second catalyst is above a threshold temperature.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system operation method comprising:
   determining engine operating conditions;
   during a first operating condition, increasing exhaust gas back pressure in a first exhaust conduit positioned upstream of a turbine and downstream of a first emission control device; and
   during a second operating condition, reducing exhaust gas back pressure in the first exhaust conduit and flowing boosted air from downstream of a compressor into a second exhaust conduit positioned upstream of a second emission control device and downstream of the turbine.

2. The method of claim 1, further comprising during a third operating condition, reducing boosted air flow from downstream of the compressor into the second exhaust conduit and further reducing the exhaust gas back pressure in the first exhaust conduit.

3. The method of claim 2, where reducing boosted air flow from downstream of the compressor to the second exhaust conduit includes inhibiting exhaust gas flow.

4. The method of claim 1, further comprising during the second operating condition exothermically reacting a reductant with the boosted air upstream of the second emission control device.

5. The method of claim 1, where the first and second emission control devices are catalysts.

6. The method of claim 1, where the first operating condition is when an engine is below a threshold temperature and the second operating condition is when the engine is above the threshold temperature.

7. The method of claim 1, where the first operating condition is when engine braking is requested in a vehicle.

8. The method of claim 1, where the exhaust gas back pressure is increased and reduced via operation of a turbine inlet valve and a turbine bypass valve.

9. The method of claim 1, where the boosted air is flowed from downstream of the compressor into the second exhaust conduit via operation of a flow valve positioned in a secondary air conduit coupled to an intake conduit and the second exhaust conduit.

10. A vehicle system comprising:
    an engine in fluidic communication with a turbocharger;
    the turbocharger including a compressor disposed in an intake conduit upstream of the engine and a turbine disposed in a first exhaust conduit downstream of the engine;
    a secondary air conduit having a flow valve coupled thereto and in fluidic communication with an intake passage downstream of the compressor and a first exhaust passage upstream of the turbine and downstream of a first emission control device;
    a turbine inlet valve positioned at a turbine inlet upstream of a second emission control device; and
    a control sub-system determining engine conditions, increasing exhaust gas back pressure in a second exhaust conduit upstream of the turbine and downstream of the second emission control device via operation of the turbine inlet valve during a first operating condition and flowing boosted air from the intake passage to the first exhaust passage via operation of the flow valve.

11. The vehicle system of claim 10, where the control sub-system increases and reduces exhaust gas back pressure in the first exhaust conduit through operation of the turbine inlet valve during a second operating condition.

12. The vehicle system of claim 10, where the control sub-system increases and reduces the exhaust gas back pressure in the first exhaust conduit via operation of a turbine bypass valve positioned in a turbine bypass conduit.

13. The vehicle system of claim 10, where the control sub-system reduces boosted air flow from downstream of the compressor into the second exhaust conduit and further reduces the exhaust gas back pressure in the first exhaust conduit during a third operating condition.

14. The vehicle system of claim 10, further comprising a turbine bypass conduit having a turbine bypass valve positioned therein.

15. The vehicle system of claim 10, where the flow valve is a 3-way valve and includes an outlet in fluidic communication with a second intake conduit upstream of the compressor.

16. A method for operation of a vehicle system comprising:
    determining engine operating conditions;
    during a first operating condition, increasing exhaust gas back pressure in a first exhaust conduit positioned upstream of a turbine and downstream of a first catalyst through operation of at least one of a turbine inlet valve and a turbine bypass valve, the turbine inlet valve positioned in an inlet of the turbine and the turbine bypass valve positioned in a turbine bypass conduit coupled upstream and downstream of the turbine; and during a second operating condition, decreasing exhaust gas back pressure in the first exhaust conduit and flowing boosted air from an intake conduit downstream of a compressor to a second exhaust conduit positioned downstream of the turbine and upstream of a second catalyst.

17. The method of claim 16, comprising during a third operating condition, inhibiting boosted air flow from downstream of the compressor into the second exhaust conduit and further reducing the exhaust gas back pressure in the first exhaust conduit.

18. The method of claim 16, where the first operating condition is when the first catalyst is below a threshold temperature and the second operating condition is when the first catalyst is above a threshold temperature.

19. The method of claim 16, where the first operating condition includes when engine braking is requested.

* * * * *